United States Patent [19]

Regnier et al.

[11] 3,851,105

[45] Nov. 26, 1974

[54] TIME DIVISION SWITCHING NETWORK EMPLOYING SPACE DIVISION STAGES

[75] Inventors: Albert Regnier, Issy-les-Moulineaux; Kevork Kevorkian, St. Germain-en-Laye; Jean Paul Lager, La Celle St. Cloud, all of France

[73] Assignee: International Standard Electric Corporation, New York, N.Y.

[22] Filed: Sept. 25, 1972

[21] Appl. No.: 291,995

[30] Foreign Application Priority Data

Oct. 12, 1973 France .......................... 73.7136594

[52] U.S. Cl. ......................... 179/15 AT, 179/15 AQ

[51] Int. Cl. ............................................. H04j 3/00

[58] Field of Search ...... 179/15 AT, 15 AQ, 15 AL, 179/18 GF; 340/166 R

[56] References Cited

UNITED STATES PATENTS

| | | | |
|---|---|---|---|
| 2,997,545 | 8/1961 | Hartley | 179/15 AL |
| 3,492,430 | 1/1970 | Vigliante | 179/15 AT |
| 3,694,580 | 9/1972 | Inose | 179/15 AQ |
| 3,736,381 | 5/1973 | Johnson | 179/15 AT |
| 3,737,586 | 6/1973 | Johnson | 179/15 AQ |
| 3,754,100 | 8/1973 | Jacob | 179/15 AQ |

*Primary Examiner*—Ralph D. Blakeslee
*Attorney, Agent, or Firm*—Delbert P. Warner; James B. Raden

[57] ABSTRACT

A time division switching network is disclosed using both time division switching stages and space division switching stages. The network is designed for high traffic volume and includes configurations in which (1) the number of channels for one direction of transmission in each time-division stage group is equal to half the number of elementary network time slots. Each time division group has control memory and speech, each such memory having rows, the number of rows of the control memory being equal to the number of network time slots and the number of rows of the speech memory being equal to the number of channels for the group.

6 Claims, 5 Drawing Figures

TIME DIVISION SWITCHING NETWORK EMPLOYING SPACE DIVISION STAGES

The present invention relates to time division switching networks designed for transmitting pulse-code modulation speech signals. Such networks may be parts of local or transit exchanges.

All the possible configurations for that type of networks are already generally known, based on arrangements of "time" division stages and "space" division stages (also called space division switches). Those networks are usually called TST (time-space-time) network; STS (space-time-space) network; TTT (time-time-time) network; etc.

Every space division switch includes one or several crosspoint matrices whose input and output numbers are clearly determined (mostly, as a power-of-two figure) and depend on the amount of traffic to be processed. Every time division stage includes at least a speech memory and a control memory whose read-write cycles are controlled by the exchange clock.

Presently, networks of this type are designed, often for experimental purposes, with a relatively small number of ingoing and outgoing channels, for instance 1,000 channels. Designing this type of network for a much larger number of channels, for instance 16,000 ingoing and outgoing channels raises reliability problems resulting from the large number of components used and also from the configuration of the time or space division stage. In addition to the number of incoming and outgoing channels, it may be suitable that the network be a non-blocking network, i.e., which provides at least one available path between any pair of idle channels, regardless of the number of paths already occupied.

The time duration allowed to the network to set up a connection between an ingoing channel and an outgoing channel depends on a network sampling period (for example 8 kHz) and on how the ingoing channel multiplexing is accomplished, and is called "elementary network time." By way of example, that elementary time may be of about 0.5 microsecond.

Within a network of this large size, channels are distributed into groups processing several trunks, each trunk including a predetermined number of channels. For instance, for a network of 16,000 incoming and outgoing channels, the network may comprise 64 groups of each eight trunks, each comprising 32 channels. In such a case, the number of elementary network time slots is 256. Each group includes essentially a control memory whose row number is equal to the number of elementary network time slots, and a speech memory whose number of rows is equal to the number of channels in a group.

It is a purpose of the present invention to provide a new time division switching network having the advantage of being suitable for a large number of incoming and outgoing channels and having an as high mean-time-between-failure as possible. Moreover, the provided network has the advantage that is a nonblocking network.

For that purpose, there is provided, according to this invention, a time division switching network characterized by the fact that the number of ingoing or outgoing channels of a group is equal to half of the number of "elementary network time slots."

With this configuration, a non-blocking network is formed which can provide access to a space division switch four times as large, that is having a number of crosspoints four times larger than in the normal blocking network case. To overcome that drawback, there is provided, according to this invention, a space division switch which includes an odd number of cascaded stages. This switch size has the advantage of using only twice the number of crosspoints which would be needed in the case of a same blocking network and, consequently, half the number of the cross-points which would be necessary in the case of a same non-blocking network.

In order to increase reliability of network operation, according to this invention, a multi-stage space division switch is divided into at least two independent, preferably identical, parallelly mounted portions. In such an embodiment, the space division switch may have either an even or odd number of stages.

According to this invention, each of the independent parallel-mounted portions in the space division switch is controlled by an independent marker. The use of separate markers makes it possible to separate memory blocks allotted to marking from memory blocks assigned to control.

In the case of a three-stage space division switch, the two end stages may be controlled by marking memory blocks, respectively located in input and output time division stages of the network. In that case, central stage marking memory blocks are independent and directly associated with corresponding central stage.

According to another feature of this invention, in order to further increase network operation reliability and for a predetermined traffic to be handled through the network, the speech memory of each group in each time division stage is duplicated while keeping the same control memory. Half of that new speech memory is assigned to carry normal traffic in the involved group while the second half is assigned, if a failure occurs in the adjacent group, to carrying traffic from that adjacent group.

According to a further feature of this invention, there is provided a time division switching network characterized by the fact that each group of each time division stage comprises:

1. A control memory whose number of rows is equal to that of the speech memory,
2. a binary-to-decimal decoder whose number of outputs is equal to the number of control memory rows so as to make possible addressing of each control memory row,
3. a ring counter connected to decoder inputs, and
4. an auxiliary memory having a number of rows equal to twice the number of rows of the main control memory, each row including only one bit and each being cyclically read under control of the exchange clock; the auxiliary memory shifting the counter by one step every time the read bit corresponds to the utilization of an elementary network time slot.

Thus, due to the control memory arrangement disclosed, there is a saving in memory space which results in a better efficiency of the number of memory bits utilized with respect to the number of ingoing or outgoing channels.

Other features of this invention will appear more clearly from the following description of embodiments, the description being taken in conjunction with the accompanying drawings, in which.

Figure 1:
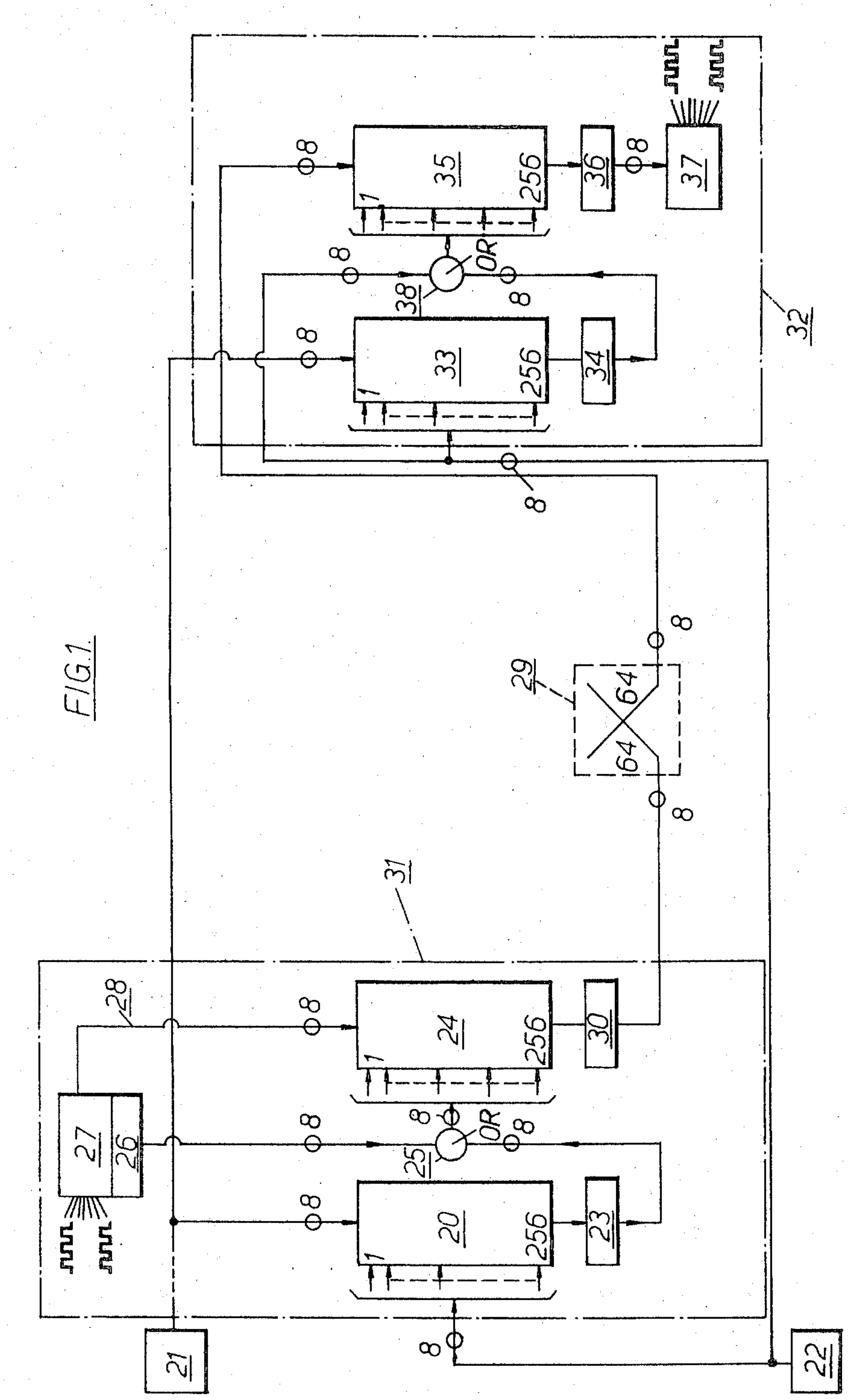
FIG. 1 is a block diagram of a conventional blocking time-space-time division network embodiment for a large number of incoming or outgoing channels.

The embodiment illustrated in FIG. 1 is a conventional time-space-time division network; however, the disclosed invention may also satisfactorily apply to a space-time-space division arrangement or to any other arrangement of time-division and space-division stages.

The network of FIG. 1 is a normal blocking network. By way of example it includes 64 independent groups of eight trunks, each including 32 channels, and may be used to switch 16,000 incoming or outgoing channels. Basically, that network comprises an input time-division stage including 64 independent groups 31, a space-division switch 29 and an output time-division stage including 64 independent groups 32, FIG. 1 showing only one input time-division group 31, the space-division switch 29 and only one output space-division group 32. The purpose of the space division switch is to connect any input group 31 to any output group 32.

Each input time-division group 31 includes a control memory 20 loaded by the exchange computer 21. In the described embodiment, control memory 20 has 256 rows and eight storage inputs from computer 21, those eight storage inputs corresponding to the eight bits of any time-division address in the speech memory. Transfer of each of the 256 binary-coded time-division addresses contained in control memory 20 is performed by an eight-wire link and is cyclically controlled by the exchange clock 22, those 256 time-division addresses corresponding to 256 "elementary network time slots." Thus, for each elementary time slot, a time-division address is transferred to control memory output register 23. The same time-division address is utilized to indicate the row for read out from speech memory 24, which also has 256 rows. The linkage between output register 23 and speech memory 24 is made through a set of eight OR gates 25. Each OR gate 25 has a second input connected to the channel-updating-logic 26, which is part of the input circuit 27 to the time-division switching network. The input circuit 27 is assigned to eight trunks, each including thirty-two channels, each channel being capable of use for one conversation. Moreover, the input circuit 27 provides multiplexing for 256 channels.

Thus, each elementary time slot is divided into a first half during which memory 24 is read under control of memory 20 and a second half during which storage is made via the 8-wire link 28 (because there are eight bits per channel) under control of logic circuitry 26.

For each incoming channel, the eight bits are transferred to the space-division switch 29 via output register 30 of speech memory 24. In the described embodiment, the space-division switch has only one stage of 64 groups of crosspoints each crosspoint switching eight wires.

The combination of control memory 20, speech memory 24, input circuit 27, logic circuit 26 and their auxiliary circuits comprise an input time-division group 31 of the input time-division stage of the network.

In a same manner, the output time-division group 32 of the output time-division stage of the network includes a control memory 33 with its output register 34, a speech memory 35 with its output register 36, which is directly connected to the output circuit 37 of the network.

As in the input group 31, there is a set of eight OR gates 38 similar to OR gates 25, each having a first input connected to output of register 34 and a second input connected to the clock 22 and simultaneously to cyclic-read-input of control memory 33.

The structure of the network illustrated in the FIG. 1 is relatively conventional and it does not need to be further described.

Figure 2:
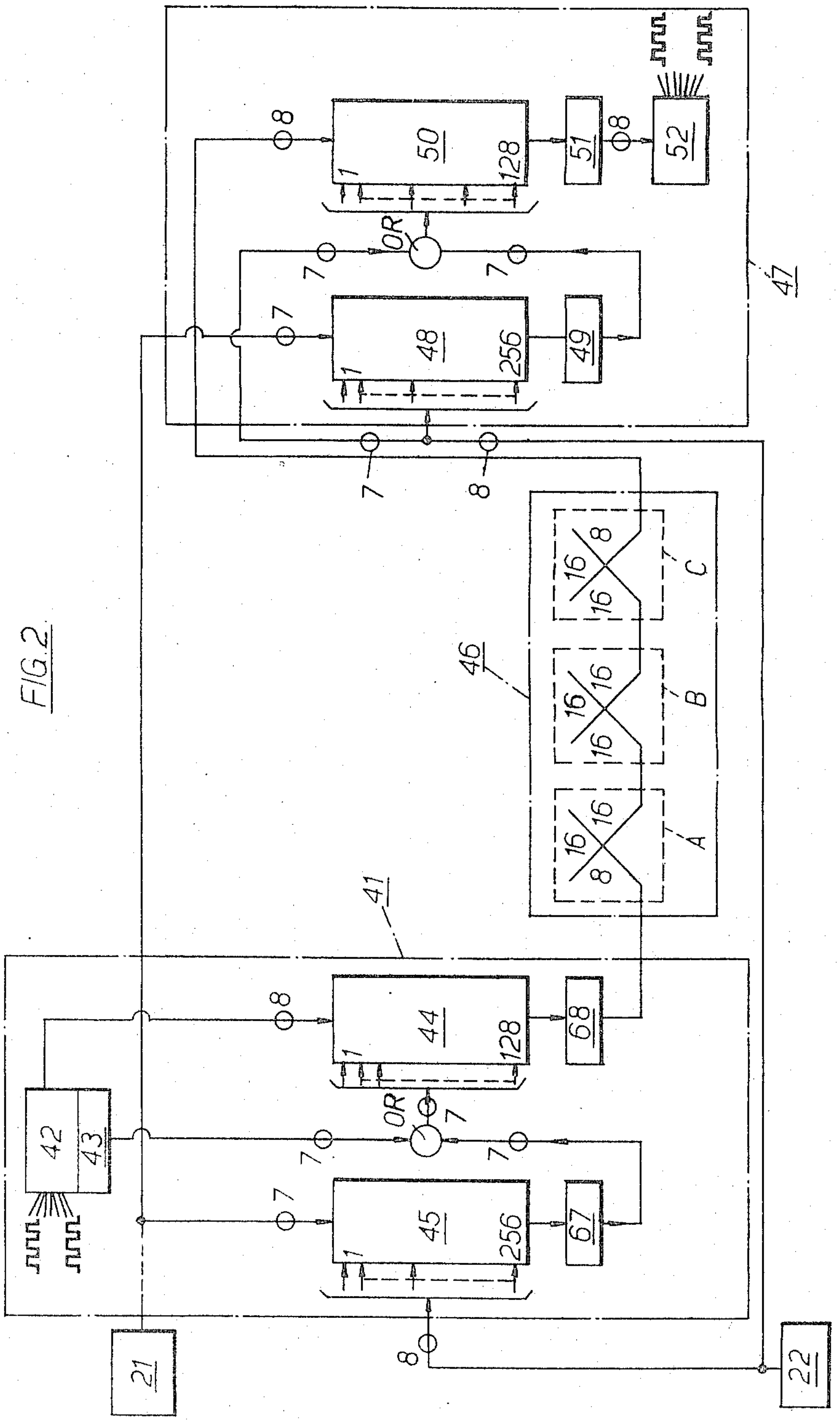
FIG. 2 is a block diagram of a nonblocking time division switching network embodiment according to this invention.

In the embodiment, illustrated by FIG. 2, the space-division switch 46 includes three cascaded stages A, B and C, stage A comprising 16 matrices having eight inputs and 16 outputs, stage B comprising 16 matrices having 16 inputs and 16 outputs, and stage C comprising 16 matrices having 16 inputs and eight outputs.

In this embodiment, input time-division group 41 is similar to time-division group 31, but input circuit 42 associated with logic circuit 43 is designed for processing only four trunks, each including 32 channels, instead of eight trunks processed by input circuit 27. As a result, speech memory 44 has only 128 rows instead of 256 rows in memory 24, each of those rows being readable at any of the 256 elementary time slots of control memory 45, which has only seven storage inputs from computer 21, i.e., there being only seven bits for addressing the 128 rows. Output register 67 for control memory 45 and output register 68 for speech memory 44 have respectively the same functions as output registers 23 and 30.

Output time-division group 47 is similar to output time-division group 32 taking into account that speech memory has only 128 rows. Group 47 comprises control memory 48 with its output register 49, speech memory 50 with its output register 51 and network output circuit 52.

The embodiment of FIG. 2 provides the advantage of producing a nonblocking network. However, in operation its reliability is not improved over that of FIG. 1.

Figure 3:
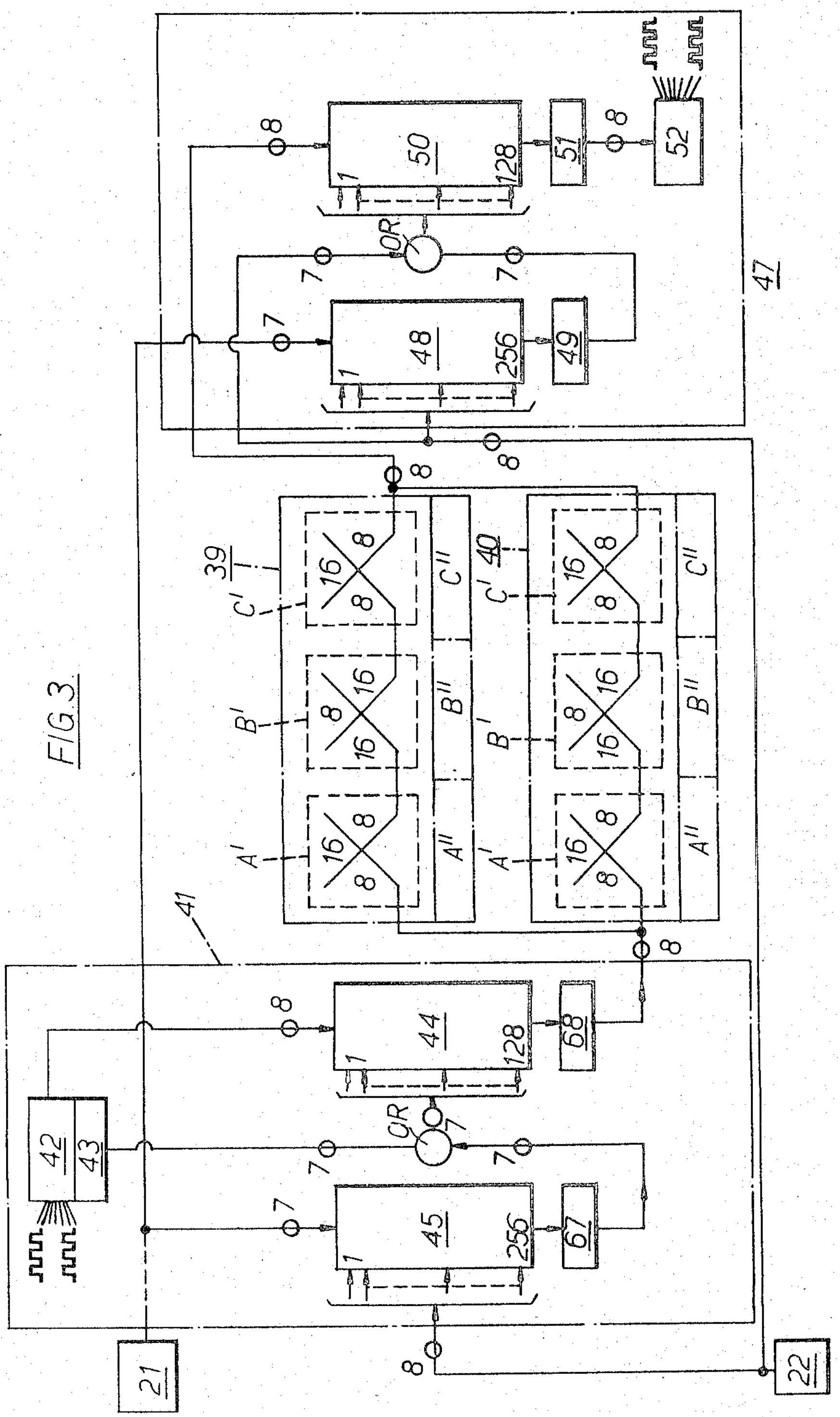
FIG. 3 is a block diagram of another time division switching network embodiment, according to this invention, providing more operation reliability.

In order to improve operation reliability thereof, it is proposed as shown in FIG. 3, to have, instead of the space-division switch 46 of FIG. 2, a space-division stage comprising two independent space division parts 39 and 40, each part comprising three stages A', B' and C'. The total quantity of crosspoints in both parts 39 and 40 is equal to that of space-division switch 46. In the embodiment of FIG. 3, stage A' is identical to stage C' and includes 16 matrices, each having eight inputs and eight outputs. The central stage B' includes eight matrices, each having 16 inputs and 16 outputs. Associated with each of the stages A', B', C' is a marking memory block A'', B'', C'', respectively, each marking memory block being controlled by computer 21 (in a conventional manner, not shown).

Thus, by dividing the space division portion into two independent space-division switch parts, the MTBF of the assembly of network portions 39 and 40 is considerably increased with respect to that of switch 46. In each network portion 39 or 40 of FIG. 3, there are an odd number of cascaded stages, obviously, substantially the same MTBF could be obtained with an even number of stages.

Figure 4:
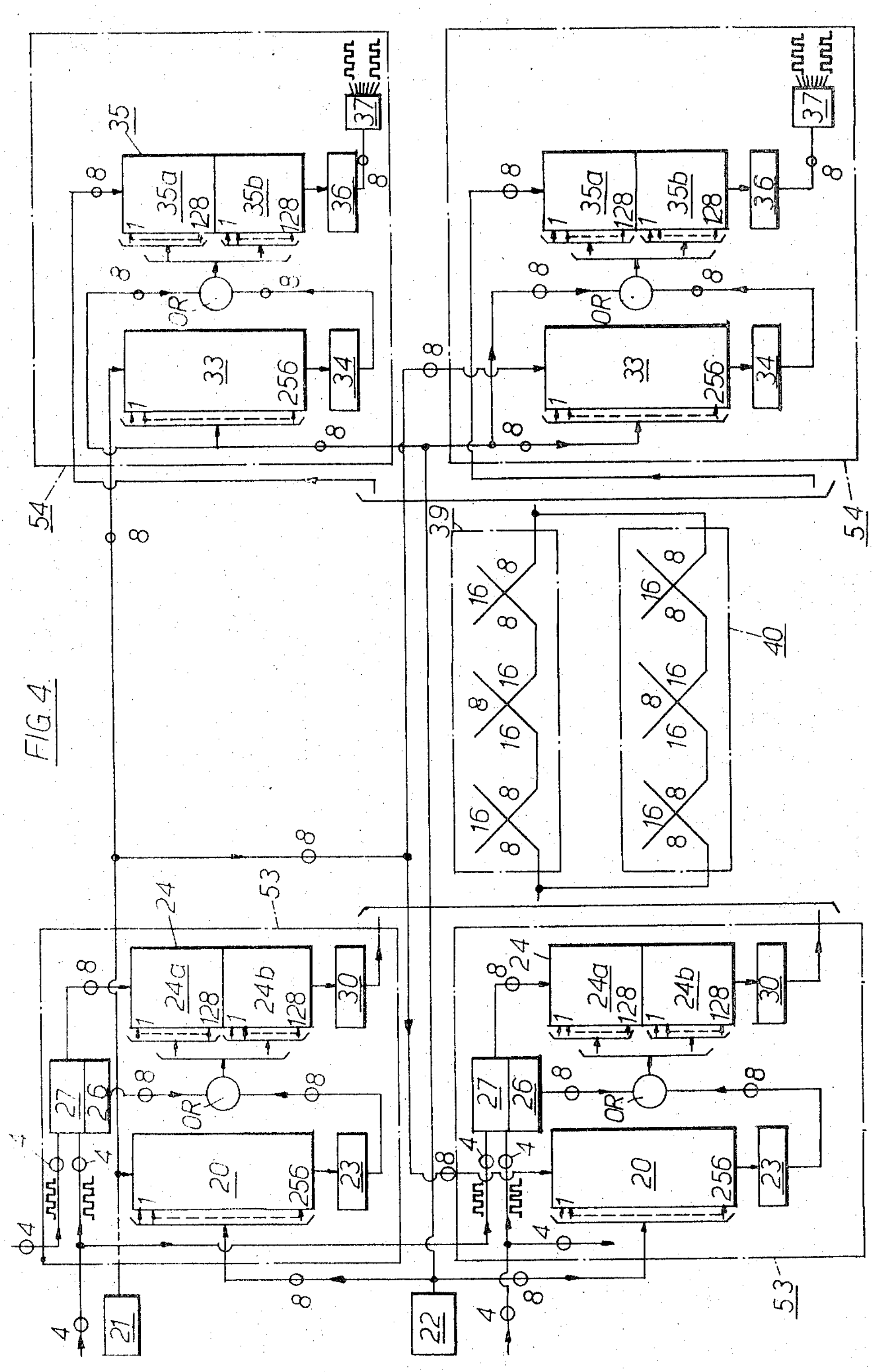
FIG. 4 is a block diagram of another time division switching network embodiment, according to this invention, wherein there is provided a stand-by speech memory.

In the embodiment illustrated in FIG. 4, input time-division group 53 is similar to time-division group 31 of FIG. 1, but it is connected to both the preceding and the following input time-division groups, respectively.

For that purpose, input circuit 27, designed for eight trunks, processes four trunks according to the method used in the embodiments of FIGS. 2 and 3, and is capable of further processing four other trunks from the adjacent group according to the same method. Thus, in stage 53, speech memory 24 processes the four trunks normally allotted to input circuit 27 in one half of its speech memory (for instance, half part 24*a*) and includes a stand-by section (for instance the other half part 24*b*) for, if necessary, processing the four trunks, each trunk having thirty-two channels, from the adjacent group.

Output time-division group 54 has a configuration similar to output time-division group 32, but speech memory 35 processes four trunks in a normal manner, which permits the other half of its speech memory to operate as a stand-by for processing four trunks from the adjacent output time-division group on occurrence of failures. Therefore, output circuit 37 for each time-division group 54 processes four trunks in normal service and eight trunks if the adjacent time-division group fails.

In a general manner, each time-division group may thus help the next time-division group if a failure occurs, such groups being arranged in cyclic permutation in one direction. Obviously, if the cyclic permutation is in the reverse direction, each time-division group may help the immediately preceding group. When a time-division group is helping an adjacent time-division group, the network is rigorously no longer a nonblocking network, at least as far as the helping group is concerned; then it is a network with low normal blocking, which is very sufficient in most of the cases.

Thus, due to division into two independent space-division stage portions and to duplication of each time-division group speech memory, the MTBF figure of the whole network is considerably increased with respect to MTBF figure for the embodiment of the FIG. 2.

Usually, that MTBF improvement is produced by, at least, duplicating each necessary piece of equipment. Conversely, according to this invention, the same advantages are produced by a simple arrangement of the space-division switch and by only duplicating time-division group speech memories.

Figure 5:
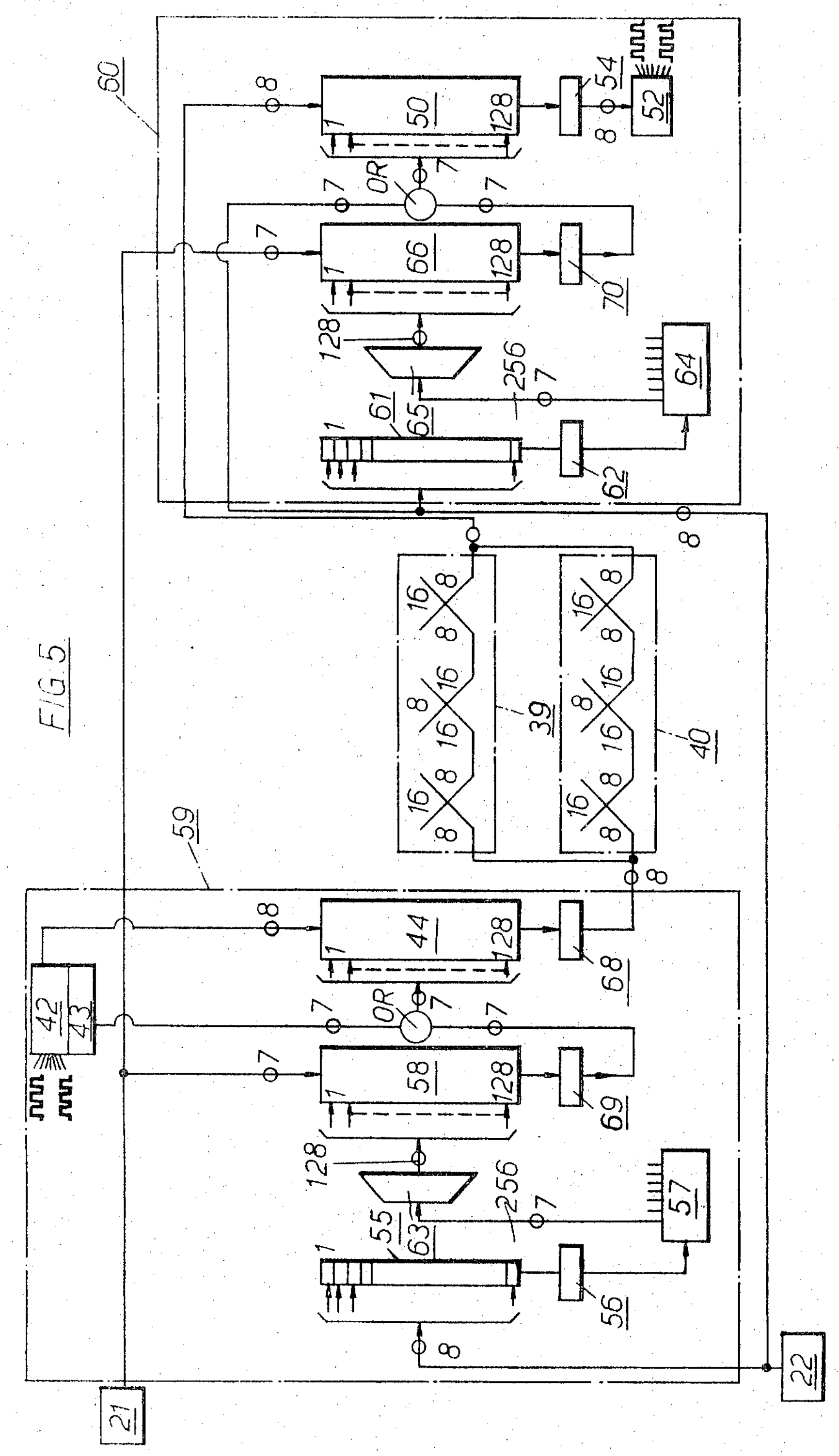
FIG. 5 is a block diagram of a further time division switching network embodiment, according to this invention, wherein there is provided a size reduction for the control memory.

The embodiment of FIG. 5 is a nonblocking time-division switching network having a greater efficiency in the number of used memory bits with respect to the number of incoming and outgoing channels, resulting from a new arrangement for the control memory of each of the input and output time-division groups 59 and 60 respectively.

In the embodiment of FIG. 2, control memory 45 has 256 seven-bit rows permitting the addressing of 128 rows of speech memory 44. Resulting from the fact that the time-division switching network provides 256 elementary time slots (for the described embodiment), the control memory cannot have only 128 rows although those 128 rows would be enough for addressing 128 rows in the speech memory. Therefore, in the embodiment of FIG. 5, there is provided an auxiliary control memory 55 including 256 rows, each row having only one bit.

Thus, information in any one of the 256 rows of auxiliary memory 55, cyclically read under control of exchange clock 22, is transferred to its output register 56. Output register 56 is connected to counter 57 having one input and seven outputs. Those seven outputs are connected to a binary-to-decimal decoder 63 having 128 positions respectively corresponding to the 128 rows of the properly said control memory 58 whose output register 69 has an identical function to that of output register 67 of FIG. 2.

Consequently, from that point, the circumstances of FIG. 2 apply and the address of the ingoing channel to be switched is determined in a same manner in speech memory 44. Conversely, the total necessary amount of control memory is reduced in the embodiment of FIG. 5, with respect to that illustrated in FIG. 2. In fact, in FIG. 2, control memory 45 includes 256 seven-bit rows, i.e., $256 \times 7 = 1,792$ memory bits while, in the embodiment of FIG. 5, the whole volume of memory used in main control memory 58 with 128 seven-bit rows and in an auxiliary control memory 55 with 256 1-bit rows is $(128 \times 7) + 256 = 1152$ memory bits.

The control memory arrangement in output time-division group 60 is similar to the control memory arrangement in input time-division group 59, since it fulfills similar functions. In this arrangement, once again auxiliary memory 61 is identical to memory 55 with its output register 62, counter 64 and decoder respectively identical to counter 57 and to decoder 63; binary-to-decimal decoder 65 having also 128 positions for addressing main control memory 66 (with its output register 70) of output time-division group 60, such a memory 66 being identical to memory 58.

Thus, the same principles apply for each of input or output time-division groups forming the input or output time-division stages of the network according to this invention. Consequently, control memory volume reduction, as previously calculated, applies for each of the groups in each of the stages, which finally results in obtaining for all control memories a volume reduction by 30 percent, which is very significant for large networks.

In the embodiment illustrated in FIG. 5, auxiliary control memory 55 having 256 rows is cyclically read under control of exchange clock 22. When a "1" occurs in output register 56, that means that an elementary network time slot is employed for switching an ingoing channel to an outgoing channel (that ingoing or outgoing channel enabling transmission of speech or data signals if any), the "1" being then transmitted to counter 57 for shifting it by one step.

The new condition combination resulting on output wires from counter 57 is transmitted to decoder 63, which will enable to address the next row (among the 128 rows) of main control memory 58.

In this case, once again the operation described in relation with the embodiment illustrated in FIG. 2, applies and the address read from memory 58 is transferred to register output 69 for addressing any one of the 128 rows of speech memory 44. In memory 44, the row which is addressed accordingly corresponds to a channel carrying a conversation and is transmitted to speech memory 50 of output time-division group 60 via one of the two independent space-division switch parts 39 and 40. Addressing of speech memory 50 to store into speech memory a channel to be used to carry a conversation is made along the same lines by means of main control memory 66 and auxiliary memory 61. Conversation channel transfer from speech memory 50 to output circuit 52 is cyclically made.

While the principles of the present invention have been hereabove described in relation with specific embodiments, it must be clearly understood that the said description has only been made by way of example and does not limit the scope of this invention.

We claim:

1. A time-division switching network for processing a large number of channels wherein each channel incorporates a set of elementary network time slots comprising, an input time-division stage, an output time division stage, and a plurality of space-division stages, each time-division stage including independent parallel groups connected to the space-division stages, each group comprising a control memory and a speech memory, the control memory including a plurality of rows equal in number to the number of elementary network time slots, the speech memory including a plurality of rows equal in number to the number of channels in the group, and the number of channels in each group being equal to half the number of elementary network time slots.

2. A time-division switching network according to claim 1, wherein the space-division stage comprises an odd number of cascaded matrices.

3. A time-division switching network according to claim 1, wherein the space-division stage is divided into at least two independent, identical, parallel parts, each part being formed by a number of cascaded stages.

4. A time-division switching stage according to the claim 3, wherein each said part is controlled by an independent marker.

5. A time-division switching network according to claim 1, wherein, for a predetermined number of ingoing or outgoing channels per group, the speech memory, in each group of each stage, is duplicated for the same control memory in the group, half of that new speech memory being allotted to normal traffic handling in said group and the second half of that new speech memory is allotted to handle traffic of an adjacent group in case of failure in the adjacent group.

6. A time-division switching network according to claim 1, wherein each group of each time-division stage comprises:

a. a control memory whose number of rows is equal to the number of rows of the speech memory;

b. a binary-to-decimal decoder whose number of outputs is equal to he number of control memory rows to enable addressing of each of the control memory rows;

c. a ring-counter connected to the said decoder inputs, and d. an auxiliary memory having a number of rows which is twice the number of the control memory rows, each auxiliary memory row including only one bit and being cyclically read under control of an exchange clock, the auxiliary memory shifting the counter by one step each time the read bit corresponds to a used elementary network time slot.

* * * * *